United States Patent
Glimcher et al.

(10) Patent No.: US 11,853,234 B2
(45) Date of Patent: Dec. 26, 2023

(54) TECHNIQUES FOR PROVIDING ACCESS OF HOST-LOCAL STORAGE TO A PROGRAMMABLE NETWORK INTERFACE COMPONENT WHILE PREVENTING DIRECT HOST CPU ACCESS

(71) Applicant: Dell Products L.P., Hopkinton, MA (US)

(72) Inventors: Boris Glimcher, Tel Aviv-Jaffa (IL); Aric Hadav, Tel Aviv (IL); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 84 days.

(21) Appl. No.: 17/568,813

(22) Filed: Jan. 5, 2022

(65) Prior Publication Data

US 2023/0214333 A1 Jul. 6, 2023

(51) Int. Cl.
*G06F 13/10* (2006.01)
*H04L 41/0803* (2022.01)

(52) U.S. Cl.
CPC ........ *G06F 13/102* (2013.01); *H04L 41/0803* (2013.01)

(58) Field of Classification Search
CPC .......................... G06F 13/102; H04L 41/0803
USPC ........................................................... 710/74
See application file for complete search history.

(56) References Cited

U.S. PATENT DOCUMENTS

| | | | |
|---|---|---|---|
| 9,727,503 B2* | 8/2017 | Kagan | G06F 13/28 |
| 9,756,128 B2* | 9/2017 | Lomelino | H04L 67/1097 |
| 2006/0184711 A1* | 8/2006 | Pettey | H04L 69/18 |
| | | | 710/316 |
| 2008/0192648 A1* | 8/2008 | Galles | H04L 67/1097 |
| | | | 370/254 |
| 2008/0288664 A1* | 11/2008 | Pettey | H04L 12/4633 |
| | | | 710/5 |
| 2014/0317206 A1* | 10/2014 | Lomelino | H04L 67/1097 |
| | | | 709/213 |
| 2015/0067229 A1* | 3/2015 | Connor | G06F 13/4022 |
| | | | 710/317 |
| 2016/0179745 A1* | 6/2016 | Nakayama | G06F 13/4022 |
| | | | 710/316 |
| 2020/0409873 A1* | 12/2020 | Kamath | H04L 47/125 |
| 2021/0286752 A1* | 9/2021 | Modukuri | G06F 13/4022 |
| 2022/0075747 A1* | 3/2022 | Shuler | G06F 13/4221 |

(Continued)

*Primary Examiner* — Christopher B Shin
(74) *Attorney, Agent, or Firm* — Muirhead and Saturnelli, LLC

(57) ABSTRACT

A host can include a programmable network interface card (NIC) or "Smart NIC" which accesses host-local drives hidden from a host processor. One configuration can include a switch with a one logical partition including the NIC as a root complex (RC) and the local drives as end points (EPs), and with another logical partition including the host processor as an RC and the NIC as an EP. A second configuration can include the NIC and switch directly connected to the host processor with an access control component (ACC) configured on switch ports connected to the local drives. A third configuration can include the NIC and local drives directly connected to the host processor with the ACC configured on host processor ports connected to the local drives. The NIC can use a multi-layer driver to communicate with the ACC and local drives hidden behind the ACC.

20 Claims, 9 Drawing Sheets

(56) References Cited

U.S. PATENT DOCUMENTS

2022/0100546 A1\* 3/2022 Cherian ................. H04L 49/70
2022/0206962 A1\* 6/2022 Kim ..................... G06F 13/102

\* cited by examiner

TECHNIQUES FOR PROVIDING ACCESS OF HOST-LOCAL STORAGE TO A PROGRAMMABLE NETWORK INTERFACE COMPONENT WHILE PREVENTING DIRECT HOST CPU ACCESS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, which are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems typically do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein include a computer-implemented method, a system and a non-transitory computer readable medium. The system includes one or more processors, and a memory comprising code that, when executed, performs the method. The non-transitory computer readable medium includes code stored thereon that, when executed, performs the method. In at least one embodiment, the method includes: configuring a switch to have a first logical partition, wherein a host processor and a network interface card (NIC) are connected to the switch, wherein the host processor is configured as a first root complex (RC) of the first logical partition, wherein the NIC is configured as a first endpoint of the first logical partition, wherein a first portion of lanes between a first port of the switch and a second port of the NIC are included in the first logical partition, wherein the first portion of lanes are included in a first connection between the switch and the NIC, and wherein the second port of the NIC is configured as a port of the first endpoint; configuring the switch to have a second logical partition, wherein one or more local physical storage devices of the host system are each connected to the switch and are each configured as an endpoint of the second logical partition, wherein the NIC is configured as a second RC of the second logical partition, wherein a second portion of lanes between a third port of the switch and a fourth port of the NIC are included in the second logical partition, wherein the second portion of lanes are included in a second connection between the switch and the NIC, and wherein the fourth port of the NIC is configured as a port of the second RC; and executing an application on a processor of the NIC, wherein said executing includes the application issuing an I/O command with a target address mapped to a physical location on a first of the one or more local physical storage devices of the host system, wherein the I/O command is sent over the second connection from the NIC to the switch and over a third connection from the switch to the first physical storage device.

In at least one embodiment, the I/O command can be serviced by the first local physical storage device. The I/O command can read data from or writes data to the target address, wherein the target address can be a logical address on a block device configured on the first local physical storage device of the host system. The NIC, as the second RC of the second partition, can enumerate the one or more local physical storage devices of the host system as endpoints of the second partition during discovery processing and can use the one or more local physical storage devices of the host system for storage capacity for storing data of one or more applications executing on one or more processors of the NIC. The one or more applications can include the application and the one or more processors can includes the processor.

In at least one embodiment, the one more applications executing on one or more processors of the NIC can include any of: a database application and a video streaming application. The host processor, as the first RC of the first partition, can enumerate the NIC as an endpoint during discovery processing. The NIC can be connected to a network, wherein one or more data storage systems can also connected to the network and expose network storage over the network to the host system. The host system can be connected to the network through the switch and the NIC, and wherein the host system can access the network storage of the one or more data storage systems through the network using the switch and the NIC connected to the network. The one or more local physical storage devices of the host system may not be directly exposed to the host processor and not directly accessible to the host processor, and wherein the one or more local physical storage devices of the host system may be directly exposed to the NIC and may be directly accessible to the NIC.

In at least one embodiment, a host system comprises: a host processor; a NIC connected directly to the host processor; a switch connected directly to the host processor; one or more local physical storage devices of the host system directly connected to one or more ports of the switch; wherein an access control component (ACC) is configured on the one or more ports of the switch directly connected to the one or more local physical storage devices of the host system; wherein a partition is configured that includes the host processor as an RC, the NIC as an endpoint, and the one or more ports of the switch, which are configured as the ACC and which are directly connected to the one or more local physical storage devices, as an endpoint; and wherein the NIC is configured with a processor that executes an application which issues commands to the ACC using a multi-layer driver, and wherein the commands include an I/O command directed to a target address mapped to a physical storage location on a first of the one or more local physical storage devices.

In at least one embodiment, the I/O command can be serviced by the first local physical storage device, wherein the I/O command can read data from or write data to the target address. The target address can be a logical address on a block device configured on the first local physical storage device of the host system, and wherein the I/O command can be sent over a first connection between the NIC to the host CPU, over a second connection between the host CPU and the switch, and over a third connection between the switch and the first local physical storage device. The third connection can be between a first of the ports of the switch configured as a port of the ACC and another port of the first physical storage device.

In at least one embodiment, the host processor, as the RC of the partition, can perform discovery processing that enumerates the NIC as an endpoint and that enumerates the one or more ports of the switch, which are configured as the ACC and which are directly connected to the one or more local physical storage devices, as an endpoint. The NIC can be connected to a network. One or more data storage systems can be connected to the network and expose network storage over the network to the host system. The host system can be connected to the network through the switch and the NIC, and wherein the host system can access the network storage of the one or more data storage systems through the network using the switch and the NIC connected to the network.

In at least one embodiment, the ACC can be a non-transparent bridge (NTB). The multi-layer driver can includes a standard kernel driver, an intermediate layer and an interface layer that communicates with the NTB and the one or more local physical storage devices of the host system. At runtime, the I/O command can invoke a first routine in the standard kernel driver, the first routine can invoke a second routine of the intermediate layer, and the second routine can invoke a third routine of the interface layer.

In at least one embodiment, a host system comprises: a host processor; a NIC connected directly to the host processor; one or more local physical storage devices of the host system directly connected to one or more ports of the host processor; wherein an access control component (ACC) is configured on the one or more ports of the host processor directly connected to the one or more local physical storage devices of the host system; wherein a partition is configured that includes the host processor as an RC, the NIC as an endpoint, and the one or more ports of the host processor, which are configured as the ACC and which are directly connected to the one or more local physical storage devices, as an endpoint; and wherein the NIC is configured with a processor that executes an application which issues commands to the ACC using a multi-layer driver, wherein the commands include an I/O command directed to a target address mapped to a physical storage location on a first of the one or more local physical storage devices.

In at least one embodiment, the I/O command can be serviced by the first local physical storage device, wherein the I/O command can read data from or write data to the target address. The target address can be a logical address on a block device configured on the first local physical storage device of the host system. The I/O command can be sent over a first connection between the NIC to the host CPU, and over a second connection between the host CPU and the first local physical storage device. The second connection can be between a first of the ports of the host processor configured as a port of the ACC and another port of the first physical storage device.

In at least one embodiment, the host processor, as the RC of the partition, can perform discovery processing that enumerates the NIC as an endpoint, and that enumerates the one or more ports of the host processor as an endpoint. The one or more ports can be configured as the ACC, or ports of the ACC. The one or more ports can be directly connected to the one or more local physical storage devices. The ACC can be an NTB The multi-layer driver can include a standard kernel driver, an intermediate layer and an interface layer that communicates with the NTB and the one or more local physical storage devices of the host system. At runtime, the I/O command can invoke a first routine in the standard kernel driver, the first routine can invoke a second routine of the intermediate layer, and the second routine can invoke a third routine of the interface layer.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Existing systems, such as host systems, can include a network interface card (NIC). A NIC is a hardware component used as a network adapter or interface which provides the host with connection to a network. In some systems, the NIC can be characterized as an enhanced NIC, sometimes also referred to as a "SmartNIC", intelligent NIC, or data processing unit, which connects the host to the network and also includes additional features, components and functionality. In some systems, the enhanced NIC can be a programmable accelerator that makes data center networking, security and storage efficient and flexible. Such an enhanced NIC can include its own one or more local processors that can execute code independent of the host CPU to offload processing that might otherwise be performed by the CPU of the host. The host can have local storage devices or drives. In some instances such as when the enhanced NIC is executing code of an application, it can be necessary and/or desirable to provide the enhanced NIC with access to the host's local storage devices or drives for storing data of the application.

Accordingly, described in the present disclosure are techniques that can be used to expand the available storage capacity of the enhanced NIC by making the host's local storage devices accessible to the enhanced NIC. In at least one embodiment, the enhanced NIC can have direct access to the host's local storage devices or drives while the host's local storage devices or drives are otherwise not directly accessible or exposed to the host's CPU. The foregoing can be configured, for example, to avoid any data corruption that might otherwise occur if both the host's CPU and the enhanced NIC are allowed to access the same host local storage devices without use of other techniques to synchronize and coordinate access to the host local storage devices.

The foregoing and other aspects of the techniques of the present disclosure are described in more detail in the following paragraphs.

Figure 1:
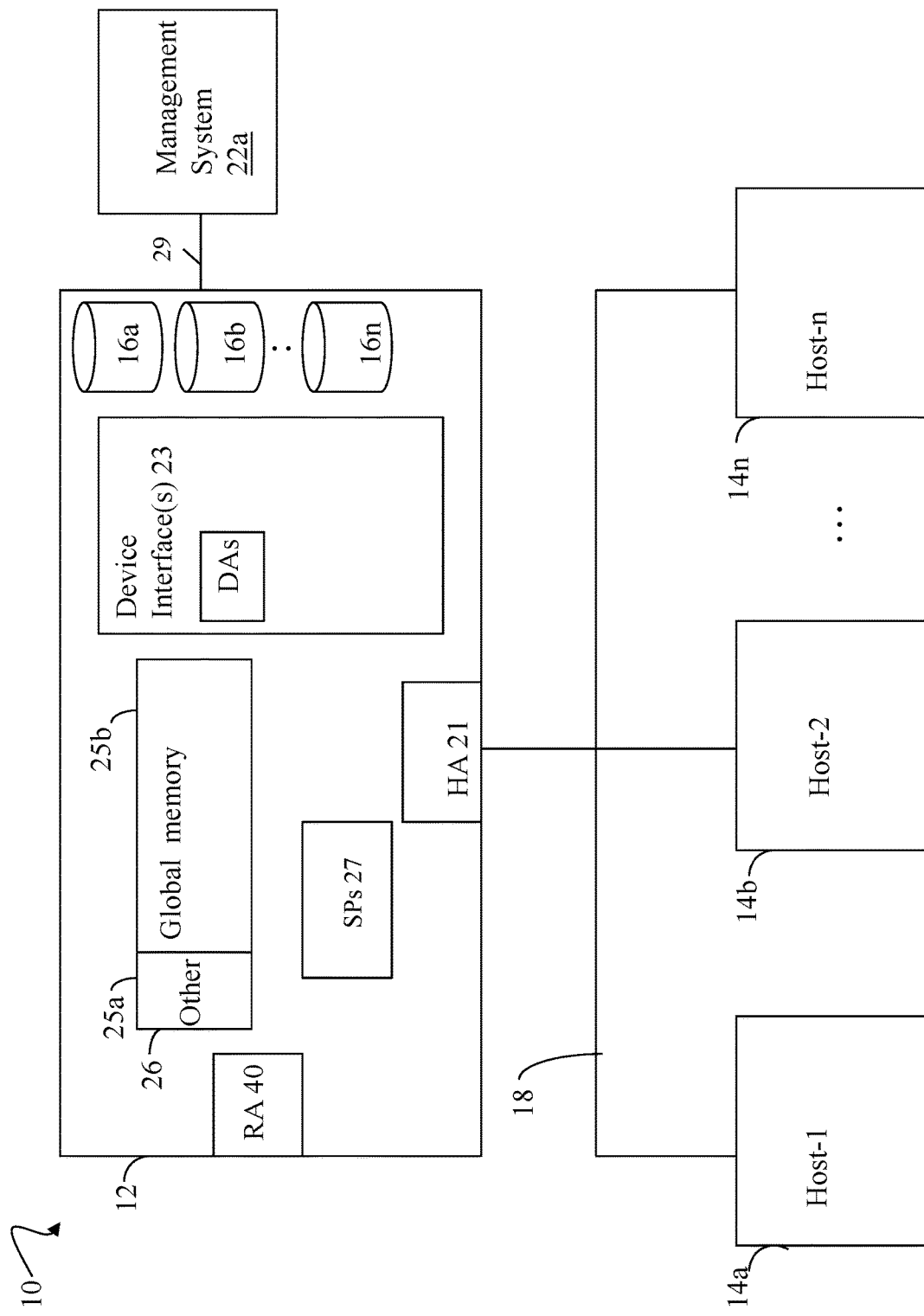
FIG. 1 is an example of components included in a system and network in at least one embodiment in accordance with the techniques of the present disclosure.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the "n" hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n can generally provide backend non-volatile storage in the data storage system 12. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices. In at least one embodiment, the devices 16a-16n can denote the BE PDs which all be non-volatile SSDs, such as flash-based storage devices and storage class memory (SCM) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDs 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN).

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein in connection with data storage systems that include a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
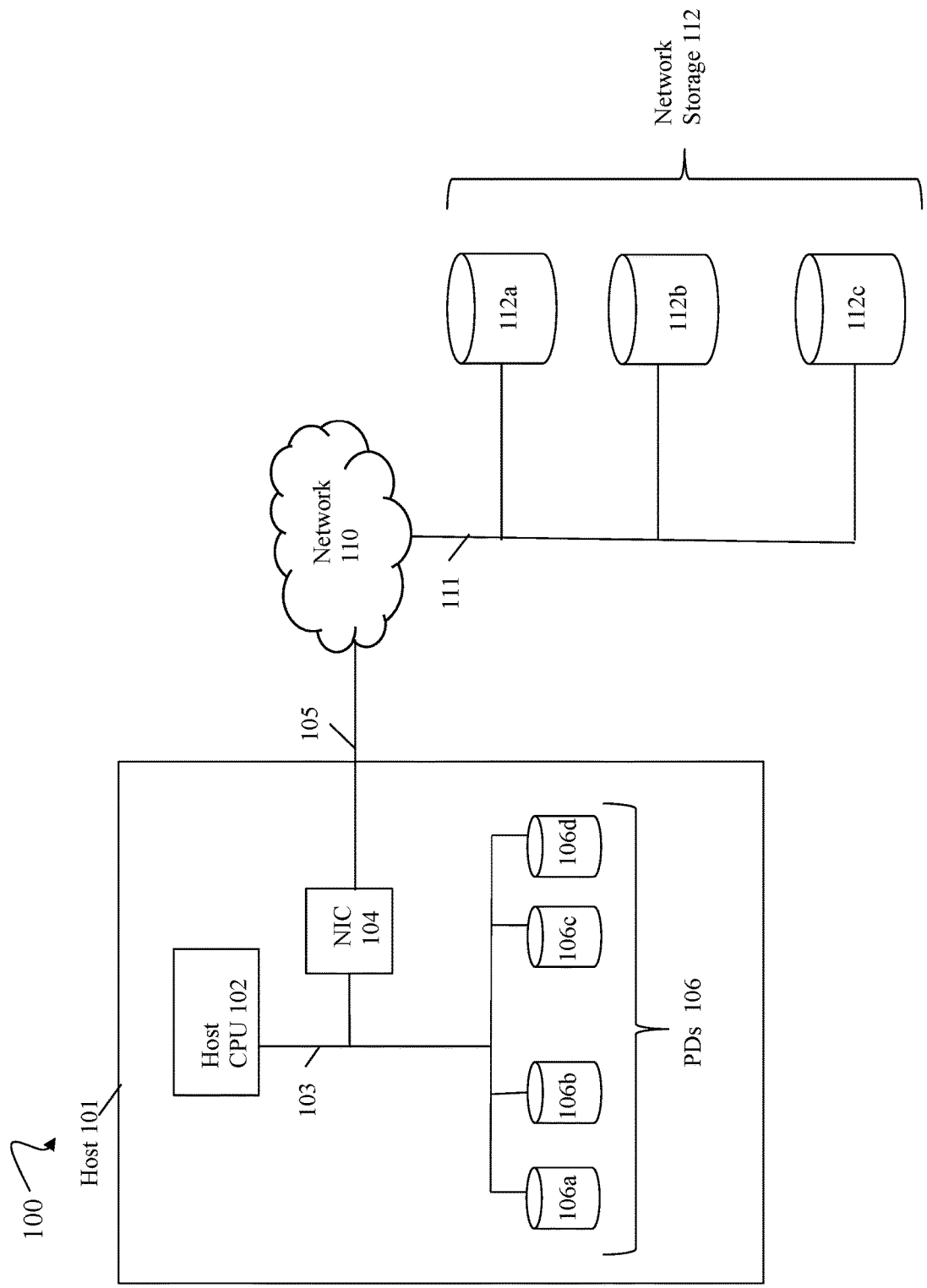
FIG. 2 is an example of components included in a data center in at least one embodiment.

Referring to FIG. 2, shown is an example 100 of components that can be included in a data center in at least one embodiment.

The example 100 includes a host 101, a network 110 and network storage 112. The host 101 further includes a host CPU 102, a NIC (network interface card) 104, PDs 106, and a connection 103 between the components 102, 104 and 106. The host system 101 is connected over the connection 105 to the network 110. In at least one embodiment, the PDs 106 can denote local non-volatile storage devices of the host system 101 that can be used locally by and within the host system 101. The PDs 106 can be non-volatile SSDs, such as flash drives, accessible using a suitable protocol such as NVMe (Non-Volatile Memory Express) or NVMe-oF (Non-Volatile Memory Express over Fabrics). In at least one embodiment, the PDs 106 may not be directly accessible or exposed externally outside of the host 101.

The network storage 112 generally denotes data storage capacity of one or more data storage systems provided over the network 110 to the host system 101. In at least one embodiment, each of the elements 112a-c can denote data storage capacity of logical devices such as block devices (e.g., SCSI-based LUNs or NVMe namespaces) and/or other storage objects presented to the host 101 over the network 110. The data storage systems represented by the elements 112a-c can be connected 111 to the network 110. In at least one embodiment, the network 110 can be a storage area network or SAN.

In at least one embodiment, the NIC 104 can be an enhanced NIC characterized as a "SmartNIC" or smart network interface card, also sometimes referred to as a DPU or data processing unit. In at least one embodiment, the NIC 104 can provide an Ethernet network connection 105 between the host 101 and the network 110.

In at least one embodiment, the NIC 104, as a "SmartNIC" or DPU, can include one or more processors or CPUs each with one or more processing cores. The NIC 104 can include one or more forms of computer storage that are volatile and/or non-volatile. For example, the NIC 104 can include memory such as RAM. The NIC 104 can be programmable and can include, for example, an FPGA, and can store executable code on the FPGA or other form of storage of the NIC. Additionally, code can also be executed on the processors of the NIC 104. The code executed can be initially stored on the NIC, or can be otherwise loaded from a source that is external to the NIC. For example, the code executed by a processor of the NIC can be downloaded from the host, another component, system or storage device (e.g., network storage 112) connected to the network 110 to which the NIC is connected, and the like.

In the following paragraphs, usage of the term NIC refers to an enhanced NIC, SmartNIC or DPU which connects the host 101 with the network 110 and also includes additional components, functionality and features as discussed herein.

In operation, the NIC 104 can be used to offload processing from the host 101, where such processing may otherwise be performed by the CPU 102 of the host 101. In this manner, the NIC 104 can be used to perform operations independently of the host CPU 102 and without involving the host CPU 102. In at least one embodiment, the NIC 104 can be used as an offload device that performs offload processing and generally reduces the workload of the host's CPU 102. For example, the NIC 104 can include one or more code modules stored thereon such as: an encryption module that performs data encryption; a decryption module that performs decryption processing; an RDMA (remote direct memory access) module that provides RDMA support such as, for example, allowing the host to directly access the memory of another system, such as a data storage system represented by 112, connected on the network 110 to the host 101 without involving either the host or the data storage system's operating system; an NVME module that provides support for accessing logical and/or physical storage devices using the NVME or NVMe-oF protocol; a security module that can include, for example, a firewall; an application such as a database (DB) application; and the like. The NIC can execute, on its one or more local processors, code of the foregoing modules or programs stored on the NIC as well as code downloaded from other sources on the host and elsewhere generally external to the NIC.

In least one embodiment, the connection 103 can be internal to the host 101 and can represent the host's internal network fabric that includes a switch, such as a PCIe (Peripheral Component Interconnect Express) switch, which is configured to provide desired connections between the components 102, 104 and 106. The NIC 104 can directly access the network storage 112. In one configuration, the PCIe switch can be configured so that all communications between the host 101 and the network 110 pass through the PCIe switch to the NIC 104, whereby the host 101 can access the network storage 112 via the PCIe switch and the NIC 104. Additionally, the PCIe switch represented by 103 can be configured so that the host CPU 102 can access its local drives, PDs 106 through the PCIe switch. However, in the foregoing configuration, it may be that the PCIe switch denoted by 103 is configured so that PDs 106 are not exposed or directly accessible to the NIC 104.

In one example use case, the NIC 104 can be used to offload processing that may otherwise be performed by the host CPU 102. For example as noted above, the NIC 104 can be used to execute a DB application rather than execute the DB application on the host CPU 102. Generally, the NIC 104 can execute code, such as of the DB application, that can require non-volatile physical storage devices used by the DB application, for example, to read and write the DB application's data stored on such non-volatile physical storage devices. Generally, the non-volatile physical storage devices can provide the data storage capacity needed to store the DB application's data and where such necessary data storage capacity is not otherwise available from storage resources located locally on the NIC 104. As such, the NIC 104 executing the DB application can require access to one or more non-volatile physical storage devices that provide the needed storage capacity and where such non-volatile physical storage devices are externally located with respect to the NIC 104. In connection with the NIC 104 performing offload processing, such as executing the DB application noted above, it may be necessary and/or desirable for the NIC 104 to have access to data storage capacity that is local to the host 101. For example, it may be desirable to store the DB application's data on one or more of the PDs 106 that are local to the host 101 and for the NIC 104 to have access to the storage capacity of the one or more of the PDs 106 providing the DB application's data.

As a result of the foregoing, the connection 103, such as the PCIe switch thereof, can generally be reconfigured to additionally expose the host 101's local PDs 106 to the NIC 104 through the PCIe switch. For example, the existing configuration of the connection 103 can be modified in accordance with NVMe-oF offload capabilities so that the PDs 106 are accessible to both the host CPU 102 and also the NIC 104.

With the above-noted reconfiguration or modification of the connection 103, and PCIe switch thereof, the NIC 104 can now access the host 101's local PDs 106 through the connection 103 and use the PDs 106 for storage such as, for example, for storing the DB application's data. However, at the same time, the host CPU 102 can also still access the same PDs 106 and also use them for storage. The foregoing of the host CPU 102 and the NIC 104 both having access to the same PDs 106 can result in data corruption with respect to the content stored on the PDs 106 unless there is some additional synchronization or coordination therebetween.

Described in the following paragraphs are techniques that can be used to solve the foregoing problem and, more generally, provide the NIC 104 with access to the host's local PDs 106. In at least one embodiment, the host 101's local PDs 106 may only be directly accessible to the NIC 104 and not directly accessible to the host CPU 102.

The foregoing and other aspects of the techniques of the present disclosure are described in more detail in the following paragraphs.

Before proceeding to solutions and discussion of embodiments of the techniques of the present disclosure, reference is made to the example 300 of FIG. 3 to first illustrate the above-noted problem described in connection with FIG. 2 in more detail.

Figure 3:
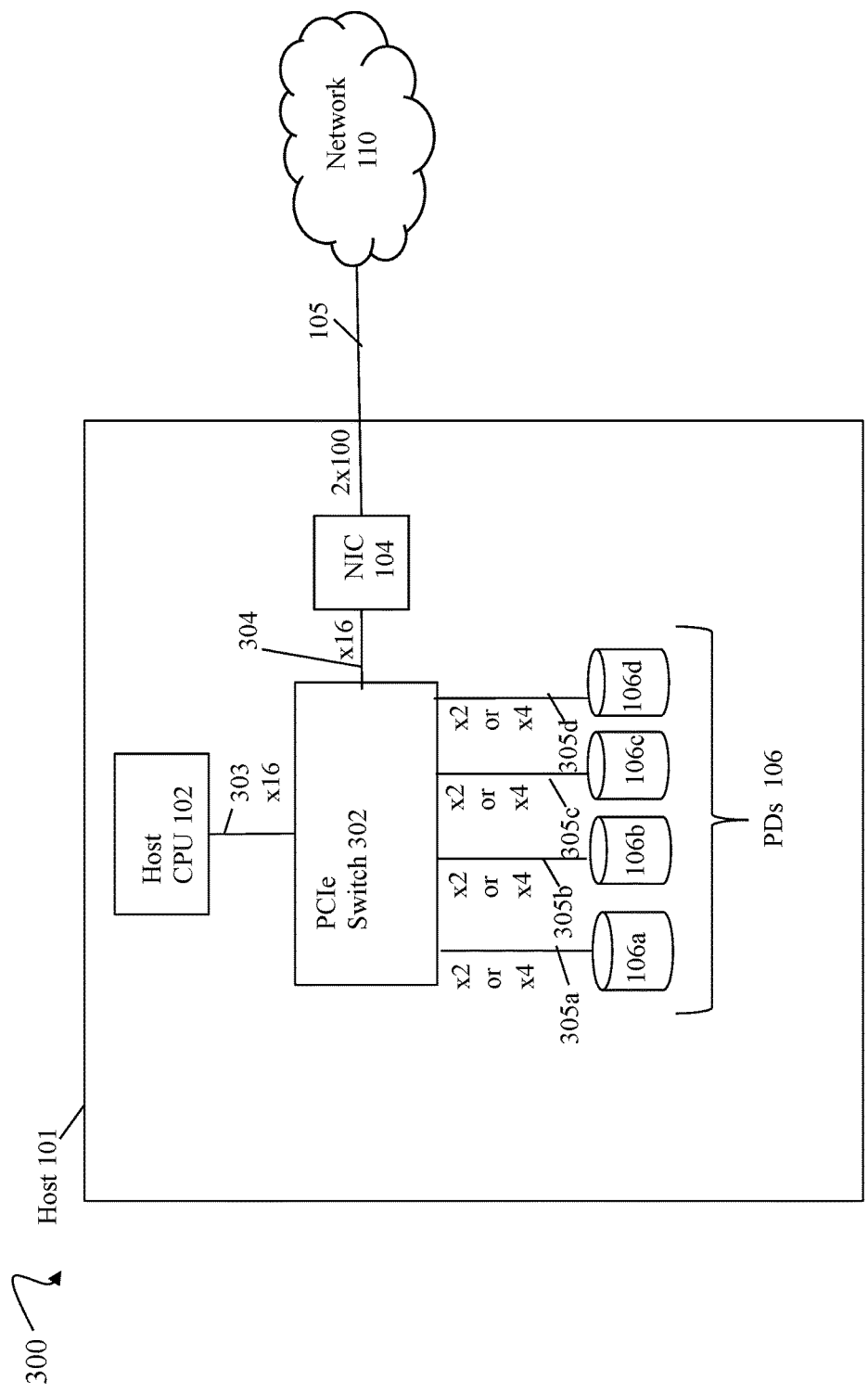
FIG. 3 is an example providing further detail regarding components included in a host of the data center of FIG. 2.

In particular, FIG. 3 provides further detail regarding components on the host 101 of FIG. 2 connected to the network 110. Other components of FIG. 2 have been omitted from FIG. 3 for simplicity of illustration. FIG. 3 includes the host 101, the host CPU 102, the PDs 106 local to the host 101, the NIC 104, the connection 105 and the network 110 as described in connection with FIG. 2. Additionally, the example 300 includes a PCIe switch 302 which is also located internally in the host 101.

Consistent with discussion above in connection with FIG. 2, the host 101 can have an internal network fabric that operates in accordance with the PCIe protocol. Generally, PCIe is a packet-based protocol that uses serial, point-to-point wired, individually clocked 'lanes', where each lane includes two pairs of data lines that can carry data upstream and downstream simultaneously (full-duplex). In at least one embodiment, the host CPU 102 may have one or more PCIe connections from the host CPU 102 to another component, such as the PCIe switch 302. A PCIe connection consists of one or more data-transmission lanes, connected serially. As noted above, each lane consists of two pairs of wires, one for receiving and one for transmitting. PCIe lanes are internal, high-speed, point-to-point, bidirectional connections. As noted above, multiple PCIe lanes can be combined or grouped into a single high-bandwidth channel sometimes referred to as a PCIe connection or link. Generally, a PCIe link or PCIe connection can include one or more lanes. For example, groups of 2, 4, 8 and 16 PCIe lanes may be so combined and are denoted, respectively, as x2, x4, x8, and x16 (although other groupings are possible). Referring to FIG. 3, the element 303 denotes a single port 16 lane (x16) PCIe connection between the host CPU and the PCIe switch 302; the element 304 denotes a single port x16 PCIe connection between the PCIe switch 302 and the NIC 104; the elements 305a-d each denote either a single port x2 or x4 PCIe connection; and the element 105 denotes 2 x100 PCIe connections or two ports, each x100.

The PCIe switch 302 operates to provide the point to point connections between the components connected to ports of the switch 302. In particular, the PCIe switch 302 forwards or routes packets from an ingress port of the switch to an egress port of the switch. In at least one embodiment, the PCIe switch 302 can be configured so that the connections 303, 304 and 305*a-d* are bidirectional. The host system 101 can generally have a limited number of lanes or pins that can be configured with connectivity to other devices or components. In at least one embodiment, the host CPU 102 can have PCIe connectivity to the devices or components 104, 106*a-d* through the PCIe switch 302.

In at least one embodiment, the host CPU can have 16 lanes (denoted as x16 of connection 303) for use in connecting to devices or components of the PCIe fabric which, in the aggregate, can require more than the available x16 PCIe lanes of the host CPU. In this manner, the PCIe switch 302 can be used to selectively switch and route communications between the host CPU and other components connected to the switch 302. In the example 300, the PCIe switch 302 operates to route packets, for example, from the host CPU 102 to the NIC 104 (e.g., over the connections 303, 304); from the NIC 104 to the host CPU 102 (e.g., over the connections 304, 303); from the host CPU 102 to the PDs 106 (e.g., over the connections 303 and 305*a-d*); from the NIC 104 to the PDs 106 (e.g., over the connections 304 and 305*a-d*); from the PDs 106 to the host CPU 102 (e.g., over the connections 305*a-d* and 303); and from the PDs 106 to the NIC 104 (e.g. over the connections 305*a-d* and 304). Thus, the host CPU 102 can communicate with the PDs 106 via the switch 302, for example, to read data from one or more of the PDs 106 and/or write data to one or more of the PDs 106. Additionally, the NIC 104 can communicate with the PDs 106 via the switch 302, for example, to read data from one or more of the PDs 106 and/or write data to one or more of the PDs 106.

Based on the above-noted discussion of FIG. 3, the PCIe switch 302 can route packets between the host CPU 102 and the PDs 106; and also between the NIC 104 and PDs 106. Thus for example, without further synchronization and coordination, both the host CPU 102 and the NIC 104 can each execute code that, at the same time, may attempt to write to the same location on the same one of the PDs 106 thereby causing data corruption.

In the configuration of FIG. 3 without use of the techniques of the present disclosure, the host CPU 102 can be configured as the single root complex (RC) which is the manager of the PCIe fabric to which it is connected. The RC denotes the root of an I/O hierarchy that connects the CPU and memory subsystem of the host 101 to the PCIe fabric of the host 101. Generally, the RC can be characterized as the interface between the host CPU 102 and the PCIe fabric which, in FIG. 3 includes, the switch 302 and connections 303, 304, and 305*a-d*. The RC resides at the root of the PCIe tree-like topology and communicates on behalf of the host CPU 102 with the other components of the host 101 in the PCIe fabric. All other devices connected to the PCIe fabric other than the RC in the I/O hierarchy can be endpoints (EPs). In one aspect, the I/O hierarchy of the PCIe fabric of FIG. 3 can be characterized as having a single domain represented using a tree with a root that is the RC with the EPs at the bottom of the hierarchy. The host CPU 102 as the RC can also be used to facilitate access to memory (not illustrated) accessible through the host CPU 102.

With the host CPU 102 configured as the RC, when the host CPU 102 boots up, it can enumerate all devices connected to the PCIe fabric as part of its discovery processing, and can communicate with all the enumerated devices to assign an address to each connected device or EP. The address can be used to uniquely identify the device on the fabric. A communication, such as from the RC or host CPU 102, can be sent to a connected device via the PCIe switch 302 by specifying the device's address used in the PCIe fabric. For example, collectively the PDs 106 and the NIC 104 can be considered as 5 EPs with the host CPU 102 configured as the RC.

As noted above, PCIe provides endpoint to endpoint communication through the PCIe switch 302 where, for example, communications can be between the RC or host CPU 102 and an EP (e.g., any of 104, 106*a-d*); or where, for example, communications can be directly between two EPs such that the communicates do not have to pass through or involve the RC or host CPU 102. Thus, the configuration of FIG. 3 (and also FIG. 2) illustrates a single RC that is responsible for system configuration and enumeration of PCIe resources and that manages interrupts and errors for the PCIe tree or domain. The host CPU, as the RC, and its EPs (e.g., 104, 106*a-d*) in the single I/O tree or domain can share a single address space and communicate through memory reads and writes and interrupts.

What will now be described is a first solution to the problem noted above where the PDs 106 are directly accessible and visible to both the host CPU 102 and the NIC 104. In at least one embodiment of the first solution discussed below, the PDs 106 are hidden or not directly exposed or visible to the host CPU 102, and where the PDs 106 are visible and directly exposed to the NIC 104. A switch, such as the PCIe switch 302, can be included internally in the host 101 for configuration in accordance with the first solution of the techniques of the present disclosure. Generally, an embodiment of the first solution is described below with reference to FIG. 4A.

Figure 4A:
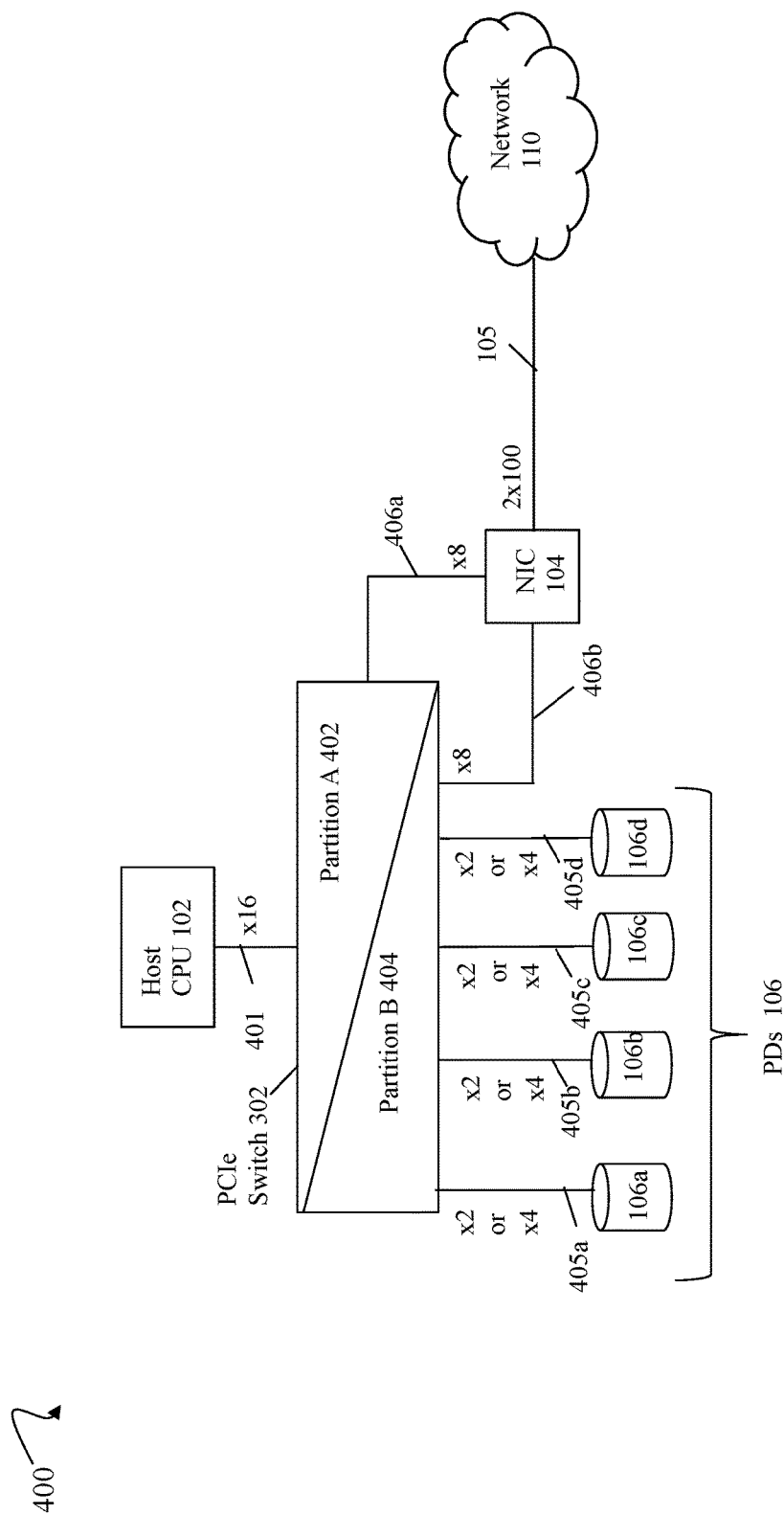
FIGS. 4A, 4B, 5A and 5B are examples of components in embodiments in accordance with the techniques of the present disclosure.

With reference to FIG. 4A, shown is a first configuration 400 in accordance with the techniques of the present disclosure.

The example 400 includes the components 102, 104, 105, 106, 110, and 302 as discussed above in connection with preceding figures with a difference that the configuration 400 of FIG. 4A is configured with two logical partitions. In particular, the PCIe switch 302 is configured into two logical partitions, A 402 and B 404, that are isolated from one another. The configuration of FIG. 3 as described above includes a single domain or single partition with a single RC and I/O hierarchy tree. In contrast, FIG. 4A illustrates a configuration of the PCIe switch 302 having two logical partitions, the partition A 402 and the partition B 404. Generally, the RC and EPs of the partition A cannot see the RC and EPs of the other partition B unless otherwise configured in the partition B. Similarly, the RC and EPs of the partition B cannot see the RC and EPs of the other partition A unless otherwise configured in the partition A.

In at least one embodiment, the single physical PCIe switch 302 can be configured into multiple logical switches or switch partitions. Each of the resulting switch partitions is logically discrete and represents an independent partition with its own PCIe hierarchy with an RC and EPs whose configuration, switching operation, and reset logic are isolated from other partitions. In this manner in at least one embodiment, ports and lanes of the PCIe switch 302 can be resources that are allocated for use by either only the partition A or only the partition B. Despite the independence of the partitions A and B, the partitions A and B can also share resources such as, for example, the control logic of the PCIe switch 302 as a global resource.

In at least one embodiment, the partition A 402 can be configured with the host CPU 102 as the RC with the NIC 104 as an EP. Using the partition A 402, the host CPU 102 is allowed continued communications over the network 110 through the NIC 104. The PDs 106 are not included in the partition A 402. In particular, the PDs 106 are not configured as EPs in the partition A 402, and thus, the PDs 106 are not directly visible or exposed to the host CPU 102. In this configuration of FIG. 4A, the host CPU 102, as the RC of the partition A can see only the configured one or more EPs of partition A. In this example with partition A, the NIC 104 is configured as the only EP whereby only the NIC 104 and not the local PDs 106 are directly exposed to or visible to the host CPU 102. Thus the host CPU 102 can communicate directly with the NIC 104 but not directly with the PDs 106. The host CPU 102 can continue to communicate over the network 110 via the PCIe switch 302 and the NIC 104, but the host CPU 102 cannot directly access the PDs 106.

In at least one embodiment, the partition B 404 can be configured with the NIC 104 as the RC, and with the 4 PDs 106a-d as 4 EPs. Using the partition B 404, the NIC 104 can access the PDs 106 over the connections 406b and 405a-d. However, the host CPU 102 is not included in the partition B and cannot directly access the PDs 106 included in the partition B. In connection with the partition B, the NIC 104, as the RC, can see the local PDs 106, where the NIC 104 and the local PDs 106 can directly communicate with one another through the PCIe switch 302.

Consistent with discussion herein, some resources can be allocated for exclusive use by each of the individual partitions A and B which are isolated from each other. For example, in the configuration of FIG. 3 described above, the NIC 104 has 16 lanes (304) configured as a single port. In contrast in the embodiment of FIG. 4A, the 16 lanes of the NIC 104 can be bifurcated and configured into two ports each with 8 lanes. In particular, 8 lanes 406a of the NIC 104 can be configured for use with partition A, and the remaining 8 lanes 406b of the NIC 104 can be configured for use with partition B. More generally, the 16 PCIe lanes of the NIC 104 can be divided among the partitions A and B so that a first portion of the 16 PCIe lanes of the NIC 104 are allocated to partition A and the remaining second portion of the 16 PCIe lane of the NIC are allocated to partition B. The first portion of the PCIe lanes of the NIC allocated to partition A can be allocated for use exclusively by partition A and not for use by partition B. The remaining second portion of the PCIe lanes of the NIC allocated to partition B can be allocated for use exclusively by partition B and not for use by partition A. In at least one embodiment as illustrated in FIG. 4A, the 16 PCIe lanes of the NIC can be equally divided and allocated between the partitions A and B so that each of the partitions A and B have 8 PCIe lanes of the NIC 104. Thus partition A includes the host CPU as the RC with its 16 lanes, and includes the NIC 104 as an EP with a single port of 8 lanes 406a of the NIC 104 used for the EP. The partition B includes the NIC 104 as the RC with a single port of 8 lanes 406b, and includes the PDs 106 as EPs each with a single port of 2 lanes or 4 lanes.

With the configuration of FIG. 4A, the NIC 104 can be generally configured as both an RC and an EP, where resources of the NIC 104 can be configured for use with the NIC 104 as the RC of the partition B, and where resources of the NIC 104 can be configured for use with the NIC 104 as an EP in the partition A. Thus the NIC 104 can function as both an RC and an EP at the same time in connection with operations performed using the different partitions A and B.

The 16 PCIe lanes of the NIC 104 can be divided and allocated exclusively for use among the partitions A and B as noted above. More generally, other configurations are possible depending on the number of PCIe lanes of the NIC. Additionally, the PCIe lanes of the NIC can be divided among the partitions A and B in any suitable manner and do not have to be equally divided among the partitions A and B as described above for purposes of illustration.

The PCIe switch 302 can have a number of lanes, such as 100 lanes, that are also divided and allocated for use by the partitions A and B. For example, the PCIe switch 302 can be configured such that a first portion of 50 lanes of the switch 302 are allocated to partition A, where the first portion of 50 lanes are allocated for exclusive use by partition A and not by partition B. An embodiment can also allocate the remaining second portion of 50 lanes of the switch 302 to partition B, where the second portion of 50 lanes are allocated for exclusive use by partition B and not partition A.

Figure 4B:
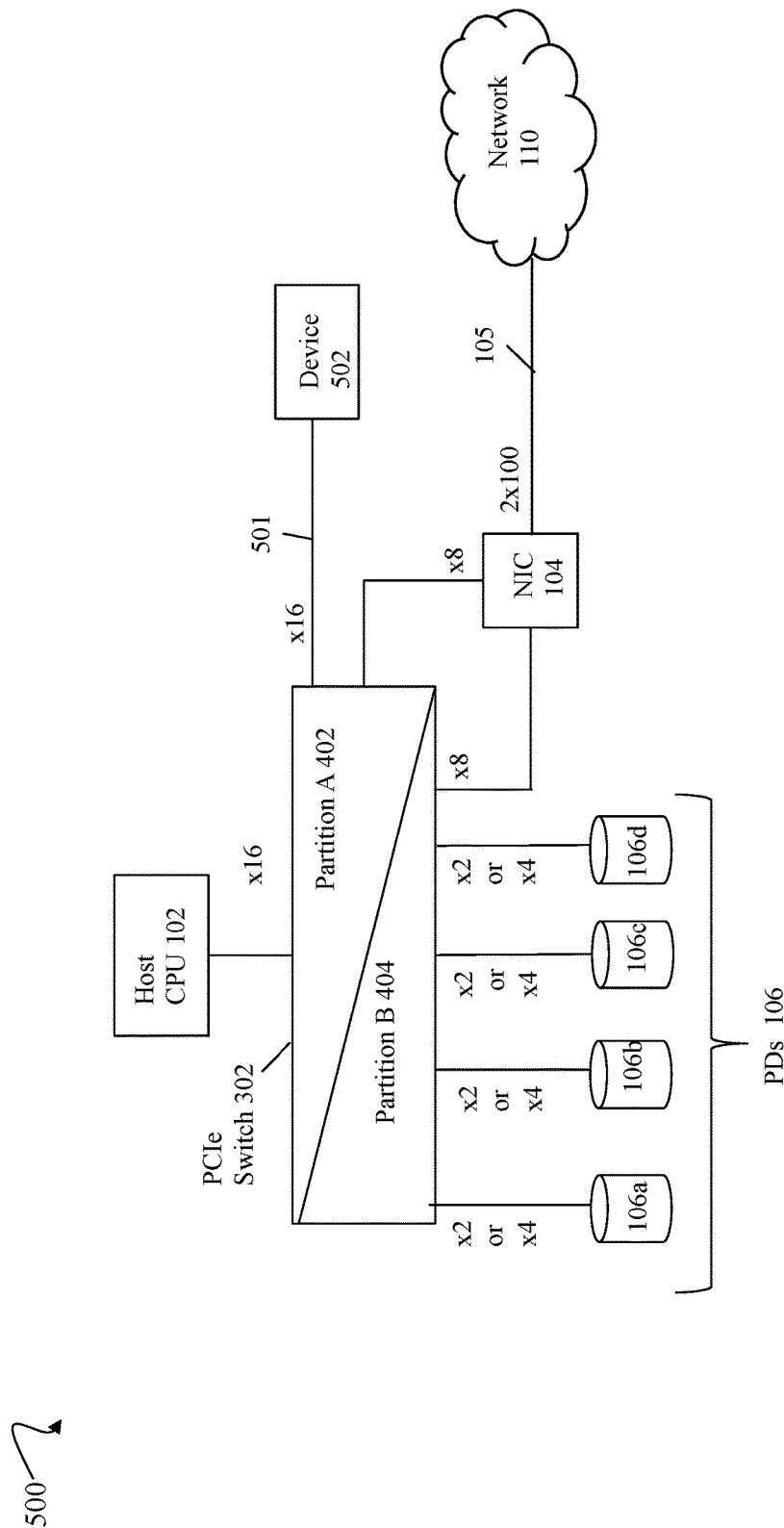

An embodiment can also have additional devices or components in one or both partitions A and B than as illustrated in FIG. 4A. For example, with reference to FIG. 4B, shown is a variation of FIG. 4A. FIG. 4B includes the same components configured as in FIG. 4A with the difference that there is an added device 502 in the partition A. The device 502 can be configured as another EP of the partition A, where the link 501 between the PCIe switch 302 and the device 502 is a single port of 16 lanes. Thus in the FIG. 4B, 16 of the 50 lanes of the PCIe switch 302 allocated to the partition A are used for the link 501 between the switch 302 and the device 502. In a similar manner, other devices can be added to one or both of partitions A and B, where each of the other devices can communicate with the switch 302 using lanes of the switch 302 allocated for exclusive use by the partition to which the device belongs.

Returning now to FIG. 4A, in accordance with the two partitions A 402 and B 404 noted above, the host CPU 102 and the NIC 104 can each boot independently as RCs and can communicate with the devices or components in their respective logical partitions, for example, to perform discovery processing and enumerate all connected devices. For example, the host CPU 102 as the RC of the partition A can boot up and can communicate with any other configured device of the partition A to establish itself as the RC and to establish the other configured device as an EP. In this example with partition A 402, the host CPU 102 boots up and communicates only with the 8 lanes (406a) of the NIC 104 to establish the host CPU 102 as the RC of the partition A 402 and the single port of 8 lanes (406a) of the NIC 104 as an EP of the partition A 402. In a similar manner, the NIC 104 boots up and can communicate with any other configured device of the partition B to establish itself as the RC and to establish the other configured device as an EP. In this example with the partition B 404, the NIC 104 boots up and communicates with the PDs 106 to establish the single port of 8 lanes (406b) of the NIC 104 as a resource of the RC of partition B 404 (e.g., the lanes 406b are a port of the RC used for communication with the RC or NIC 104) and to establish the 4 PDs 106a-d as 4 EPs of partition B 404.

In connection with FIGS. 4A and 4B as well as others herein illustrating embodiments in accordance with the techniques of the present disclosure, it should be noted that particular details are provided as non-limited examples. The number of PCIe connections, the particular number of lanes in the PCIe connections, and the like, are provided for illustration purposes only. More generally, the techniques of the present disclosure can be used in connection with other variations and configurations.

Figure 4C:
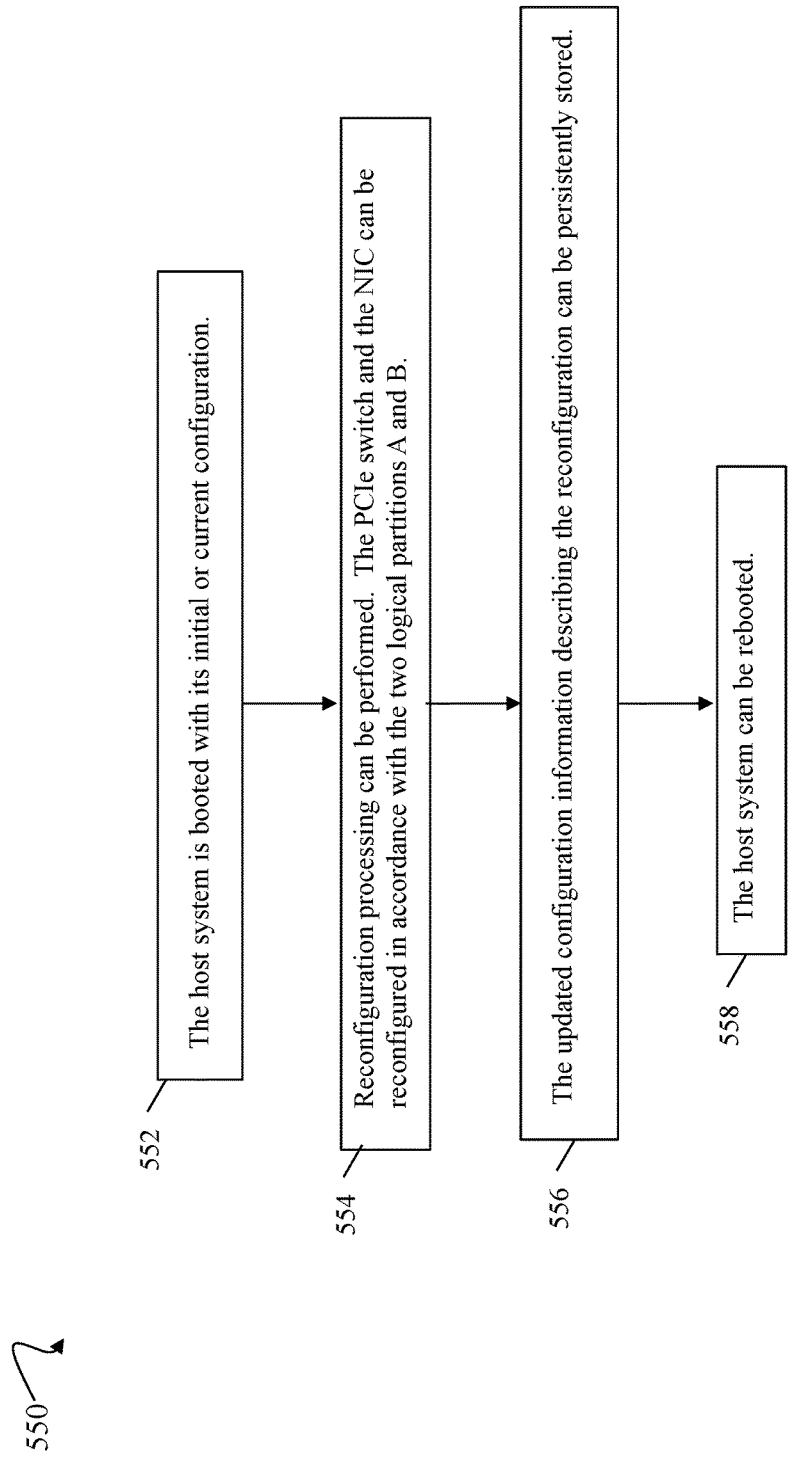
FIG. 4C is a flowchart of processing steps that can be performed in at least one embodiment in accordance with the techniques of the present disclosure.

What will now be described in connection with FIG. 4C are processing steps that can be performed in connection with at least one embodiment in accordance with the first solution of the present disclosure. The processing steps of the flowchart 550 of FIG. 4C summarize processing described above in connection with FIGS. 2, 3 and 4 that can be performed in an embodiment where the host system 101 has an initial configuration as discussed in connection with FIGS. 2 and 3, and where the host system 101 can then be subsequently reconfigured as discussed in connection with FIG. 4A.

At a first step 552, the host CPU 102 can boot with the initial configuration, for example, as described in connection with FIGS. 2 and 3. In the step 552, the host CPU performs discovery processing and performs enumeration to learn what devices are present in its single partition or single domain PCIe network fabric and then maps the discovered devices into its memory space. From the step 552, control proceeds to a step 554.

At the step 554, reconfiguration processing can be performed, such as using the host CPU, to reconfigure the switch 302 to have the two logical partitions, partition A 402 and partition B 404, each with allocated associated resources as discussed above. The step 554 can include using the host CPU for reconfiguring the switch 302 and also reconfiguring the NIC 104. The switch 302 can be reconfigured to have the two logical partitions A and B each with specified resources such as, for example, a number of dedicated PCIe lanes of the switch 302 and where each of the partitions A and B has its own RC and one or more EPs. The NIC 104 can be reconfigured so that, for example, it identifies as the RC of partition B and an EP of partition A. Furthermore, particular PCIe lanes of the NIC 104 can be allocated and configured as resources for use when the NIC 104 functions as the RC of the partition B and when the NIC 104 functions as the EP of partition A. For example, as discussed above, a first portion of 8 lanes (406a) of the NIC 104 can be assigned for exclusive use by partition A and function as an EP of partition A. Additionally, a different second portion of 8 lanes (406b) of the NIC 104 can comprise a single port assigned for exclusive use by partition B, where the NIC functions as the RC of partition B and the single port of 8 lanes 406b are configured as a port of the RC (e.g., NIC) of partition B. The partition A can be configured with the host CPU as its RC and the first portion of 8 lanes (406a) of the switch 302 configured as a single port of an EP. The partition B can be configured with the second portion of 8 lanes (406b) of the NIC 104 as a port of the RC and with the PDs 106 as EPs. It should be noted that generally when a device or component is configured as an RC, such as the host CPU and the NIC 104, a processor of the device or component configured as the RC is used in connection with performing the processing of the RC. From the step 554, control proceeds to the step 556.

At the step 556, the updated configuration can be stored persistently. Generally, any configuration changes or updates made in the step 554 to any particular component can be persisted within that particular component. For example in at least one embodiment, the configuration changes made in the step 554 to the PCIe switch 302 can be stored persistently within the PCIe switch 302; and the configuration changes made in the step 554 to the NIC 104 can be stored persistently within the NIC 104. In particular, the updated configuration information stored within the PCIe switch 302 can include information describing the configuration of the two logical partitions, partition A 402 and partition B, defined in the step 554. The updated configuration information stored on the NIC 104 can include information identifying the NIC 104 as the RC of the partition B 404, the particular PCIe lanes of the NIC 104 allocated for use as the RC of the partition B 404, and the particular PCIe lanes of the NIC 104 allocated for use as the EP of the partition A 402. Generally, the updated configuration can be stored persistently in any one or more suitable locations. From the step 556 control proceeds to the step 558.

At the step 558, the host system 101 can be rebooted. In at least one embodiment, the step 558 can include rebooting the host CPU 102, the PCIe switch 302 and the NIC 104 in accordance with the updated configuration information. The host CPU 102 and the NIC 104 can each be rebooted independently in accordance with the updated configuration information with the two logical partitions A 402 and B 404. In at least one embodiment, the host CPU 102 can reboot as the RC of the partition A 402 and can discover and enumerate the NIC 104 as the only EP of the partition A; and the NIC 104 can reboot as the RC of the partition B 404 and can discover and enumerate the 4 PDs 106a-d as 4 EPs of the partition B 404.

Based on the configuration of FIG. 4A, the host CPU 102 can communicate over the network 110 over the connection 401 to the PCIe switch 302 and over connection 406a to the NIC 104 in accordance with the partition A 402. Thus the host CPU 102 can continue to access the network storage 112 using connections 401, 406a, 105. In accordance with the partition B 404, the NIC 104 sees the PDs 106 and can directly access the PDs 106, for example, to read and write data of the DB application executing on the NIC 104. An application executing on a processor of the NIC 104 can, for example, issue I/O operations to the PDs 106 over the connections 406b and 405a-d. In accordance with the partitions A 402 and B 404, the host CPU 102 does not see the local PDs 106 and cannot access the local PDs 106 directly. Put another way, the PDs 106 are not exposed or visible directly to the host CPU 102 in either partitions A or B. However, the PDs 106 are exposed and visible directly to the NIC 104 in the partition B. As a result, the host CPU 102 cannot read and/or write directly to the PDs 106 thereby eliminating the simultaneous dual access of the PDs 106 by the NIC 104 and the host CPU 102. Access to the PDs 106 can be characterized as controlled by the NIC 104. For example, the NIC 104 can have one or more applications executing thereon such as, for example, the DB application along with another application such as a video streaming application. The host CPU 102 may communicate with one of the applications executing on the NIC 104, for example, to access (e.g., read and/or write) application data used by the one application where the application data can be stored on the PDs 106. However, the host CPU 102 cannot directly access the PDs 106 due to the separation introduced by the partitions A 402 and B 404.

The foregoing first solution can generally be implemented in existing suitable configurations. However, some existing configurations may be incapable or unsuitable for implementing the foregoing first solution. For example, the NIC 104 may be incapable of functioning as the RC in that it does not have suitable hardware and/or software to function as an RC. As another example, the NIC 104 may not be directly connected to the same PCIe switch as the local PDs 106. In any case, described below is a second solution in accordance with the techniques of the present disclosure.

The second solution described below generally uses an access control component (ACC) to hide the PDs 106 from the host CPU 102 and to prevent the host CPU 102 from accessing the PDs 106. In general terms, the ACC can function as a filter or interface which provides controlled or selective access to devices, components, or generally any entity behind the ACC. Put another way, the ACC does not automatically and transparently directly expose devices, components and entities which can be characterized as behind the ACC. In general terms, a first device or component can communicate with a second device or component behind the ACC if the first device or component specifies the correct or proper key using an appropriate access control mechanism or method. In at least one embodiment using PCIe described below in connection with FIGS. 5A and 5B, the ACC can be a non-transparent bridge (NTB). However, more generally, the ACC can be implemented using any suitable hardware and/or software capable of performing the processing and function as described herein, for example, in connection with the NTB.

In at least one embodiment, the NTB can be selectively positioned within the host's internal PCIe network fabric to hide its local PDs 106 from the host CPU 102. Generally, an NTB is a bridge that is not transparent in that communications do not automatically pass through the NTB from one side of the NTB to the other. In at least one embodiment of the techniques of the present disclosure using an NTB, the host CPU can be configured as the RC but cannot see the devices on the other side of the NTB. For example, the host CPU as the RC can see the NTB as an EP device, where the PDs 106 on the other side of the NTB from the host CPU are not exposed or visible to the host CPU.

Figure 5A:
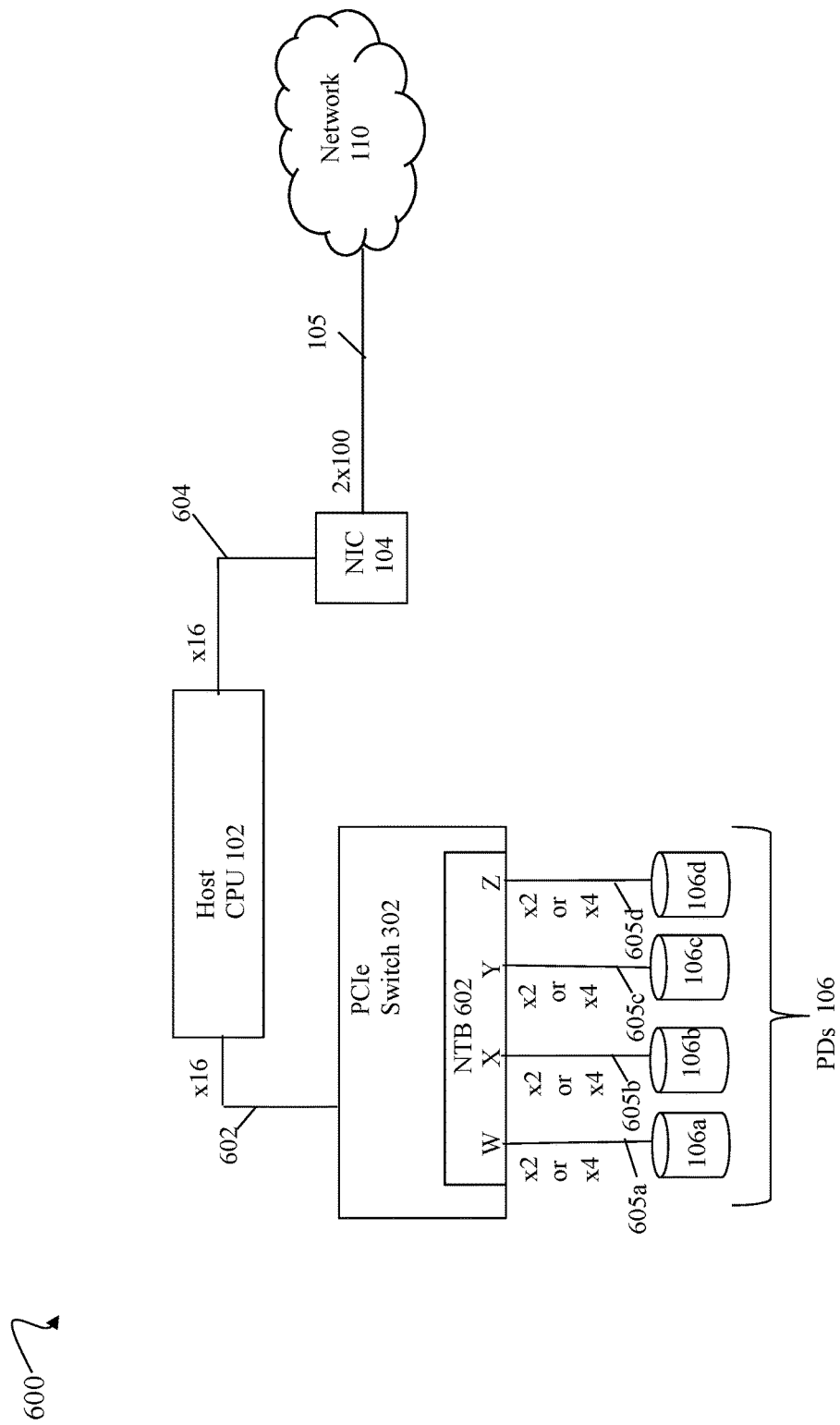

Referring to FIG. 5A, shown is a configuration 600 of components in at least one embodiment implementing the second solution in accordance with the techniques of the present disclosure.

In the configuration 600, the components 102, 302, 104, 105, 106 and 110 can be generally as described above but with a difference in that an NTB 602 is configured and included in the PCIe switch 302 with respect to the PCIe connections or ports 605a-d connected to the PDs 106. Additionally, in the configuration 600 in at least one embodiment, the PCIe fabric of the host can be configured with a domain with the host CPU 102 as the RC. When the host CPU 102 as the RC performs discovery processing to enumerate all of its connected devices, the NIC 104 is identified as an EP and the NTB 602 is also identified as an EP device. In this manner, the PDs 106 on the opposing side of the NTB 602 are not transparent and not directly visible or directly exposed to the host CPU 102 during its discovery and device enumeration processing.

In the configuration 600, the element 602 denotes a single port 16 lane PCIe connection between the host CPU and the PCIe switch 302; the element 604 denotes a single port 16 PCIe connection between the host CPU 102 and the NIC 104; the elements 605a-d each denote either a single port 2 lane or 4 lane PCIe connection between the PCIe switch 302 and the PDs 106a-d; and the element 105 denotes 2 x100 PCIe connections or two ports, each 100 lanes.

In at least one embodiment, the NTB 602 can be implemented using software that programs the switch 302 to implement the NTB functionality. Generally, the NTB functionality can be implemented in hardware or as a combination of hardware and software.

In connection with the configuration of FIG. 5A, the PCIe ports or lanes of the PCIe switch 302 directly connected the PDs 106 can be configured and enabled as the ports or lanes of the NTB 602. In particular, the ports of the PCIe switch denoted as W, X, Y and Z in FIG. 5A can be configured and enabled as ports or lanes of the NTB 602. In this manner, no devices or components (e.g., PDs 106a-d) connected to the PCIe ports or lanes 605a-d of the PCIe switch 302 are directly exposed or visible to the host CPU 102. In this case, when the host CPU 102 performs discovery processing and enumerates connected devices, the ports, lanes or connections 605a-d of the switch 302 configured as the NTB 602 appear to the host CPU 102 as an EP and the NIC 104 also appears as an EP.

Based on the configuration 600, the host CPU 102 can communicate over the network 110 via the NIC 104. Additionally based on the configuration 600, the PDs 106 are not directly exposed to or visible to the host CPU 102 such as part of the host CPU's discovery and enumeration processing. Techniques that can be used by the NIC 104 to communicate with the PDs 106 behind the NTB 602 in at least one embodiment in accordance with the techniques of the present disclosure are described below following discussion of another example configuration of the FIG. 5B using an NTB.

Figure 5B:
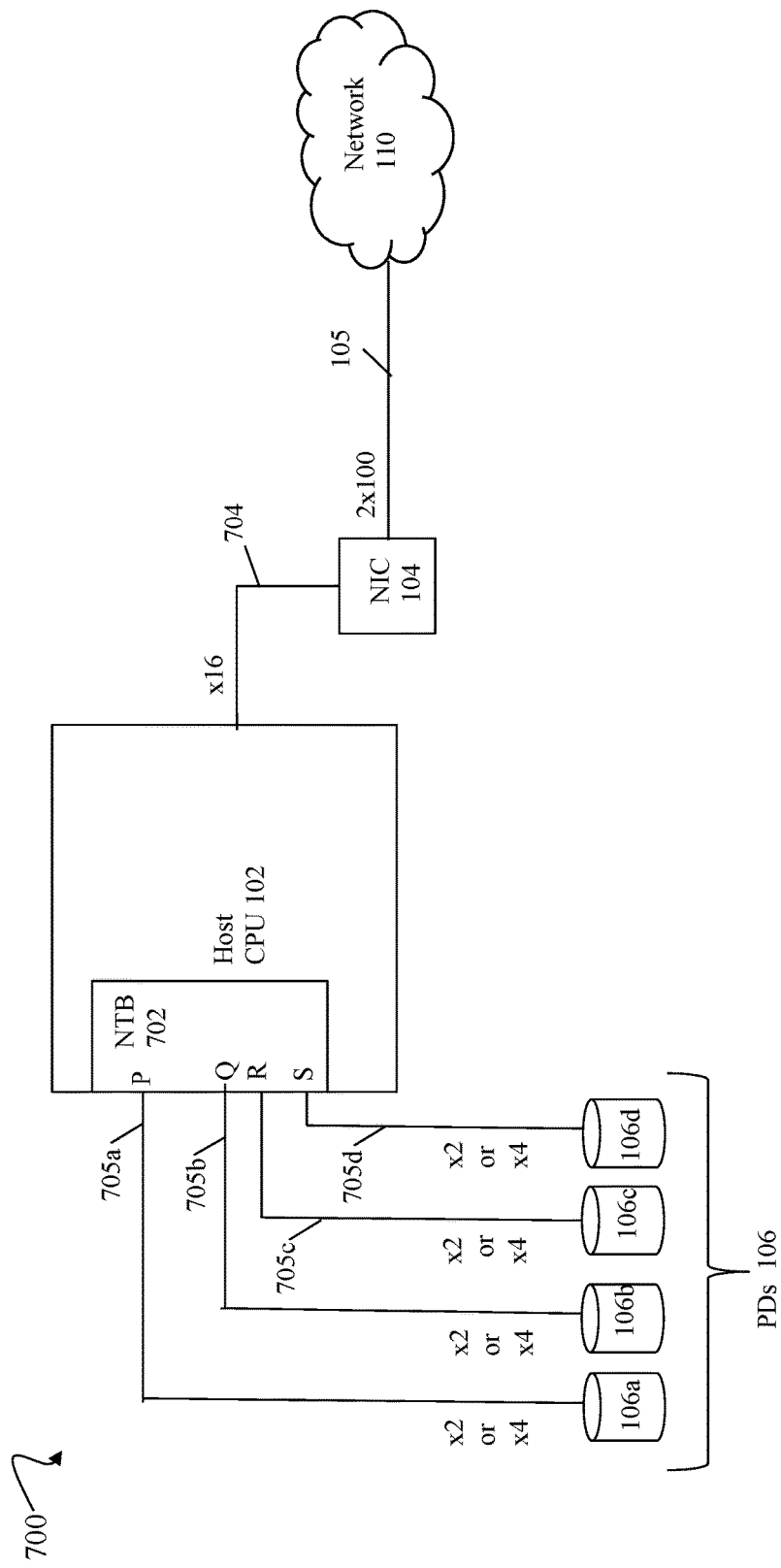

Referring to FIG. 5B, shown is a configuration 700 of components in at least one embodiment implementing the second solution in accordance with the techniques of the present disclosure.

In the configuration 700, the components 102, 104, 105, 106 and 110 can be generally as described above but with a difference in that the NTB 702 is configured in the host CPU 102 with respect to the PCIe connections or ports 705a-d connected to the PDs 106. Additionally, in the configuration 700 in at least one embodiment, the PCIe fabric of the host can be configured with a single domain with the host CPU 102 as the RC. When the host CPU 102 as the RC performs discovery processing to enumerate all of its connected devices, the NIC 104 is identified as an EP and the NTB 702 is also identified as an EP device. In this manner, the PDs 106 on the opposing side of the NTB 702 are not transparent and not directly visible or directly exposed to the host CPU 102 during its discovery and device enumeration processing.

In the configuration 700, the element 704 denotes a single port x16 PCIe connection between the host CPU 102 and the NIC 104; the elements 705a-d each denote either a single port 2 lane or 4 lane PCIe connection between the host CPU 102 and the PDs 106a-d; and the element 105 denotes 2 x100 PCIe connections or two ports, each 100 lanes.

The configuration 700 illustrates an embodiment in which there is no PCIe switch and where the PDs 106 as well as NIC 104 can be directly connected to the host CPU 102. In this case, the NTB 702 can be implemented as a feature of the host CPU 102. In at least one embodiment, the host CPU 102 of FIG. 5B can include support for configuring the desired NTB 702 on specified lanes or ports of the host CPU 102 configured for communication between the host CPU 102 and the PDs 106a-d. In at least one embodiment, the BIOS (Basic I/O Subsystem) can be used to configure the NTB 702 on the specified PCIe lanes or connections 705a-d connected directly and respectively to the PDs 106a-d. For example, using BIOS settings of the host CPU 102, the NTB 702 functionality can be enabled for specified lanes or ports 705a-d of the host CPU 102 configured for communication with the PDs 106a-d. In this manner, the host CPU 102 can see the NTB 702 as an EP but cannot see or access the PDs 106 on the other side of the NTB 702.

As known in the art, the BIOS, such as of the host system having the host CPU 102, is firmware used to perform hardware initialization during the booting process (power-on startup), and to provide runtime services for operating systems and programs. The BIOS firmware is typically pre-installed on a computer's system board, and it is the first software that is run when the system is powered on. In at least one embodiment, the BIOS, for example, initializes and tests the system hardware components, and loads a boot loader from a mass storage device which then initializes an operating system. In accordance with the techniques of the present disclosure in at least one embodiment, the various settings of the BIOS can be used to configure and enable the particular PCIe lanes or ports 705a-d of the host CPU 102 directly connected to the PDs 106a-d as connections to the NTB 702 so that all devices connected over 705a-d to the PCIe switch 302 are hidden behind the NTB 702.

In connection with the configuration of FIG. 5B, the PCIe ports or lanes 705a-d of the host CPU 102 directly connected to the PDs 106 can be configured as the ports or lanes of the NTB 702. In particular, the ports P Q, R and S of the host CPU 102 can be configured as the ports or lanes of the NTB 702. In this manner, no devices or components (e.g., PDs 106a-d) connected to the PCIe ports or lanes 705a-d of the host CPU 102 are directly exposed or visible to the host CPU 102. In this case, when the host CPU 102 performs discovery processing and enumerates connected devices, the ports, lanes or connections 705a-d of the host CPU 102 configured as the NTB 702 appear to the host CPU 102 as an EP and the NIC 104 also appears as an EP.

Based on the configuration 700, the host CPU 102 can communicate over the network 110 via the NIC 104 using the connections 604 and 105. Additionally based on the configuration 700, the PDs 106 are not directly exposed to or visible to the host CPU 102 such as part of the host CPU's discovery and enumeration processing. Techniques that can be used by the NIC 104 to communicate with the PDs 106 behind the NTB 702 in at least one embodiment in accordance with the techniques of the present disclosure are described below.

Figure 6:
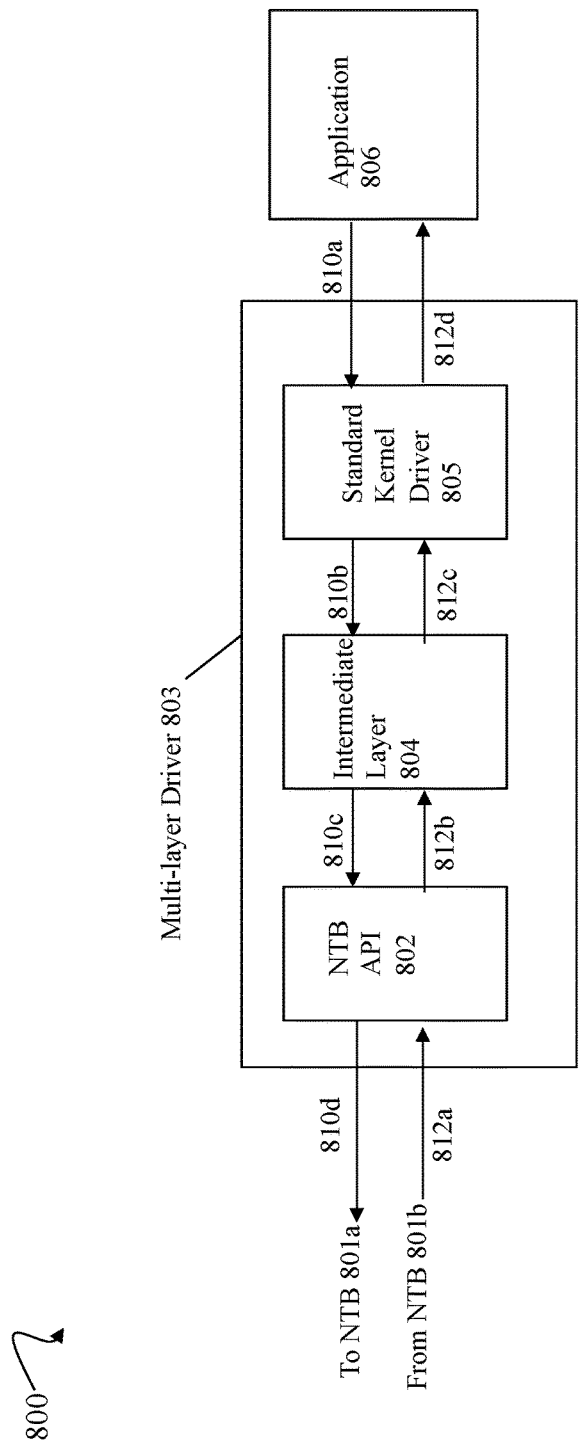
FIG. 6 is an example of a multi-layer driver that can be used in at least one embodiment in accordance with the techniques of the present disclosure.

In connection with an embodiment using an NTB as the ACC in configurations, for example, such as described in connection with FIGS. 5A and 5B above, what will now be described with reference to FIG. 6 is a multi-layer driver that can be used by a first device or component, such as the NIC 104, to communicate with another device or component, such as the PDs 106a-d, that are behind the NTB and thus are not directly accessible and not directly exposed to the first device or component.

Referring to FIG. 6, shown is an example 800 illustrating a multi-layer driver 803 that can be used in at least one embodiment in accordance with the techniques of the present disclosure. In particular, the multi-layer driver 803 can be used by the NIC 104 in configurations such as illustrated in FIGS. 5A and 5B to communicate with one of the PDs 106 behind the NTB (e.g., the element 602 denotes the NTB in FIG. 5A, and the element 702 denotes the NTB in FIG. 5B).

The example 800 includes the multi-layer driver 803 and the application 806. Generally, the driver 803 and the application 806 can include executable code that is stored on the NIC 104 and also executed by a processor of the NIC 104. Consistent with other discussion herein, the application 806 can be, for example, the DB application having its data stored on the local PDs 106 of the host 101.

In at least one embodiment, the multi-layer driver 803 can include an NTB API (application programming interface) 802, an intermediate layer 804, and a standard kernel driver 805. The elements 802, 804 and 805 can be libraries or modules of executable code that can be stored, for example, in volatile or non-volatile memory or storage of the NIC 104.

In general operation at runtime, the application 806 can issue a first call 810a to a first routine or method in the standard kernel driver 805. Code of the first routine in the driver 805 can then invoke or issue a second call 810b to a second routine or method in the intermediate layer 804. Code of the second routine in the intermediate layer 804 can then invoke or issue a third call 810c to a third routine in the NTB API 802. Code of the third routine in the NTB API 802 can then communicate 810d with the NTB and the hidden devices on the other side of the NTB. Generally, the NTB API 802 can include code that interfaces or communicates with the NTB and the devices hidden behind the NTB. The foregoing traversal 810a, 810b, 810c, 810d can denote a runtime sequence or execution call stack of routines invoked in connection with sending a communication from the application 806 to the NTB and/or a device (e.g., one of the PDs 106) that is hidden behind the NTB. The traversal or path denoted by the sequence 812a-d can denote a return runtime path from the NTB and/or device hidden behind the NTB to the application 806 that initiated the first call 810a. The sequence of calls denoted by 810a-810d can denote the runtime path of a request from the application 806 to the NTB or device behind the NTB (801a), where the request can include data, depending on the particular request. The sequence denoted by 812a-812d can denote the return path of a response sent from the NTB or device behind the NTB (801b) in response to the request. The response can include return data or information depending on the particular request.

In at least one embodiment, the storage capacity of the PDs 106 can be configured and accessed as NVMe block devices or storage volumes where data in a particular block device or volume can be accessed using LBAs or logical offsets. In this manner, data can be read from and/or written to a target address by specifying a namespace identifier (NSID) (e.g., denoting the NVMe block device) and a logical offset or LBA within the NSID or NVMe block device. In at least one embodiment, the application 806 can issue commands or requests that are standard commands or requests of the standard kernel driver 805. The standard kernel driver 805 can include code for commands and requests issued to NVMe block devices. In this manner, the application 806 can issue standard NVMe block device commands and requests of the driver 805 which are automatically mapped or translated by the intermediate layer 804 to corresponding commands or requests of the NTB API 802.

In at least one embodiment, the NTB API 802 can be a proprietary API of routines used to control access to the NTB and communicate with the NTB and devices (e.g., PDs 106) hidden behind the NTB 801a. Rather than expose the NTB API 802 directly to the application 806, the intermediate layer 804 can be used to map or translate an incoming NVMe block device command or request from the application 806 in accordance with the standard kernel driver 805 to one or more corresponding commands or requests of the NTB API 802. In this manner, the application 806 can issue commands or requests in accordance with the NVMe standard to NVMe block devices. The developer of the application 806 does not have to modify the existing application 806 to use the proprietary API calls of the NTB API 802. The existing application 806 may, for example, issue reads and writes to an NVMe block device, issue NVMe-based commands or requests to query information regarding existing NVMe block devices, and the like. The application 806 can then be used with the techniques of the present disclosure without modification using the multi-layer driver 803 in at least one embodiment.

To further illustrate, the application 806 can issue one or more commands or requests as part of its discovery processing to query for configuration information regarding existing devices on the other side of NTB. The one or more commands or requests can be standard NVMe commands or requests used to enumerate the hidden devices on the other side of the NTB and provide information about the discovered devices. For example, one or more NVMe commands or requests can be issued to obtain a list of the PDs 106, to obtain a list of the NVMe block devices and associated NSIDs configured on the PDs 106, and/or to obtain configuration information, such as storage capacity or size information, about the PDs 106 and/or configured NVMe block devices. For example, the application 806 can issue a first query command or request that is a call to a first routine in the standard kernel driver library 805. The first routine of 805 can then be mapped by the intermediate layer 804 to one or more corresponding calls to other routines in the NTB API 802 to implement the first query command. The corresponding routines of the NTB API 802 can then communicate with the NTB, PDs 106, and/or other components to obtain the required information. In at least one embodiment, the other components can include a management component or controller (MC). In at least one embodiment, the MC can communicate with different components in the host system for management of such components. The MC can, for example, communicate with the PDs 106 to obtain configuration information about the PDs. In at least one embodiment, a routine of the NTB API 802 can communicate with the NTB to obtain configuration information about the PDs 106. In turn, the NTB may communicate with the MC to obtain the configuration information about the PDs 106. The configuration information can then be returned from the MC to the NTB, and from the NTB to the application 806 via the return path 812*a-d* in response to the query issued by the application 806 running on the NIC.

In a manner similar to that as described above for one or more commands or requests as part of its discovery processing, the application 806 can also issue read and/or write commands to an NVMe block device using a discovered NSID of the NVMe block device. The read and/or write commands issued to the driver 805 are also similarly processed by mapping or translating the read and/or write commands by the intermediate layer 804 to corresponding commands or requests in the NTB API 802. In this manner, the read and/or write commands can have a call path or sequence denoted by 810*a-d* in order to implement and pass the commands through the NTB to the particular NVMe block device(s) identified in the commands. Responses or replies to the read and/or write commands can be returned by the NTB via the return path 812*a-d*.

In at least one embodiment in which the PDs 106 are SSDs accessed using the NVMe protocol, the standard kernel driver 805 can be a standard driver for NVMe block devices with capabilities extended using the intermediate layer 804 to an additional transport layer, NTB. In this manner in at least one embodiment, the intermediate layer 804 can be viewed as an extension module that extends the capabilities of the standard kernel driver 805.

The NTB is one example of an ACC that can be used in an embodiment of the second solution in accordance with the techniques of the present disclosure. As another example, an embodiment can implement the ACC using a Volume Management Device or VMD capability and feature available from Intel Corporation. In at least one embodiment, Intel® VMD is a storage controller with hardware logic inside the host CPU which helps manage and aggregate NVMe SSDs. The Intel® VMD behaves as an "integrated EP" to the host CPU's RC so that operating system or BIOS device enumeration stops at the Intel® VMD. Intel® VMD is processor feature that enables direct control and management of NVMe SSDs from a PCIe bus without additional hardware adaptors. Intel® VMD is specifically designed for management of NVMe SSDs connected to Intel® Xeon® CPUs. With Intel® VMD enabled, all PCIe devices, such as the PDs 106, behind the VMD controller are not directly exposed to the host CPU. In this manner, other implementations of an ACC, such as the VMD, can alternatively be used and configured in place of the NTBs as illustrated in FIGS. 5A and 5B. Depending on the particular implementation of the ACC in an embodiment, different techniques and information can be required in order to communicate with the hidden devices or other components behind the ACC where such hidden devices are not directly exposed to the host CPU 102.

In at least one embodiment, the multi-layer driver 803 of FIG. 6 can be a generalized model for use in communicating with any suitable technique used to implement the ACC. In such an embodiment, the driver 805 can interact with customized versions of the components 802 and 804 that are customized for use with the particular ACC implementation. For example, consider an implementation that uses the VMD. In this case, versions of the components 802 and 804 can be customized for use with the VMD rather than the NTB.

In at least one embodiment, the ACC, such as an NTB, can further use a cryptographic key in connection with accessing the PDs 106 of FIGS. 5A and 5B. For example, in at least one embodiment, in order for the application 806 to access information regarding the PDs 106 behind the NTB, the application 806 may be required to provide a registered key when issuing a command to access PDs behind the NTB or acquire any information regarding devices behind the NTB. The key can be previously registered with the NTB so that only applications providing such a preregistered key is allowed to access the hidden PDs 106 behind the NTB. The key can be, for example, a cryptographic key. For example, the key can be a public key used in connection with public-private key encryption. The public key can be used by the NTB to encrypt the data or information returned to the application which can use the corresponding private key to decrypt the encrypted information received.

With reference back to FIG. 5A, communications, such as I/O operations or requests, can be sent between the NIC 104 to the NTB 602 over the connections 604 and 602. If the communication request, such as an I/O operation or request, is directed to a particular one of the PDs 106*a-d*, the NTB 602 can facilitate sending the communication to the particular one of the PDs 106*a-d* respectively over an associated one of the connections 605*a-d*.

With reference back to FIG. 5B, communications, such as I/O operations or requests, can be sent between the NIC 104 to the NTB 702 over the connection 704. If the communication request, such as an I/O operation or request, is directed to a particular one of the PDs 106*a-d*, the NTB 702 can facilitate sending the communication to the particular one of the PDs 106*a-d* respectively over an associated one of the connections 705*a-d*.

As noted above, in at least one embodiment, logical devices can be configured or provisioned from the PDs 106, where the logical devices can be, for example, NVMe block devices. In such an embodiment, an application executing on a processor of the NIC 104 in connection with any of the embodiments of FIGS. 4A, 4B, 5A and 5B can issue I/O operations and other commands or requests in accordance with the NVMe protocol and storage entities, such as NVMe block devices, configured using physical storage from the PDs 106.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method of configuring a host system comprising:
    configuring a switch to have a first logical partition, wherein a host processor and a network interface card (NIC) are connected to the switch, wherein the host processor is configured as a first root complex (RC) of the first logical partition, wherein the NIC is configured as a first endpoint of the first logical partition, wherein a first portion of lanes between a first port of the switch and a second port of the NIC are included in the first logical partition, wherein the first portion of lanes are included in a first connection between the switch and the NIC, and wherein the second port of the NIC is configured as a port of the first endpoint;
    configuring the switch to have a second logical partition, wherein one or more local physical storage devices of the host system are each connected to the switch and are each configured as an endpoint of the second logical partition, wherein the NIC is configured as a second RC of the second logical partition, wherein a second portion of lanes between a third port of the switch and a fourth port of the NIC are included in the second logical partition, wherein the second portion of lanes are included in a second connection between the switch and the NIC, and wherein the fourth port of the NIC is configured as a port of the second RC; and
    executing an application on a processor of the NIC, wherein said executing includes the application issuing an I/O command with a target address mapped to a physical location on a first of the one or more local physical storage devices of the host system, wherein the I/O command is sent over the second connection from the NIC to the switch and over a third connection from the switch to the first physical storage device.

2. The computer-implemented method of claim 1, wherein the I/O command is serviced by the first local physical storage device.

3. The computer-implemented method of claim 1, wherein the I/O command reads data from or writes data to the target address, wherein the target address is a logical address on a block device configured on the first local physical storage device of the host system.

4. The computer-implemented method of claim 1, wherein the NIC, as the second RC of the second partition, enumerates the one or more local physical storage devices of the host system as endpoints of the second partition during discovery processing and uses the one or more local physical storage devices of the host system for storage capacity for storing data of one or more applications executing on one or more processors of the NIC, wherein the one or more applications include the application and wherein the one or more processors includes the processor.

5. The computer-implemented method of claim 4, wherein the one more applications executing on one or more processors of the NIC include any of: a database application and a video streaming application.

6. The computer-implemented method of claim 1, wherein the host processor, as the first RC of the first partition, enumerates the NIC as an endpoint during discovery processing.

7. The computer-implemented method of claim 1, wherein the NIC is connected to a network, wherein one or more data storage systems are connected to the network and expose network storage over the network to the host system, wherein the host system is connected to the network through the switch and the NIC, and wherein the host system accesses the network storage of the one or more data storage systems through the network using the switch and the NIC connected to the network.

8. The computer-implemented method of claim 1, wherein the one or more local physical storage devices of the host system are not directly exposed to the host processor and are not directly accessible to the host processor, and wherein the one or more local physical storage devices of the host system are directly exposed to the NIC and are directly accessible to the NIC.

9. A host system comprising:
    a host processor;
    a NIC connected directly to the host processor;
    a switch connected directly to the host processor;
    one or more local physical storage devices of the host system directly connected to one or more ports of the switch;
    wherein an access control component (ACC) is configured on the one or more ports of the switch directly connected to the one or more local physical storage devices of the host system;
    wherein a partition is configured that includes the host processor as an RC, the NIC as an endpoint, and the one or more ports of the switch, which are configured as the ACC and which are directly connected to the one or more local physical storage devices, as an endpoint; and
    wherein the NIC is configured with a processor that executes an application which issues commands to the ACC using a multi-layer driver, and wherein the commands include an I/O command directed to a target address mapped to a physical storage location on a first of the one or more local physical storage devices.

10. The host system of claim 9, wherein the I/O command is serviced by the first local physical storage device, wherein the I/O command reads data from or writes data to the target address, wherein the target address is a logical address on a block device configured on the first local physical storage device of the host system, and wherein the I/O command is sent over a first connection between the NIC to the host CPU, over a second connection between the host CPU and the switch, and over a third connection between the switch and the first local physical storage device, wherein the third connection is between a first of the ports of the switch configured as a port of the ACC and another port of the first physical storage device.

11. The host system of claim 9, wherein the host processor, as the RC of the partition, performs discovery processing that enumerates the NIC as an endpoint and that enumerates the one or more ports of the switch, which are configured as the ACC and which are directly connected to the one or more local physical storage devices, as an endpoint.

12. The host system of claim 9, wherein the NIC is connected to a network, wherein one or more data storage systems are connected to the network and expose network storage over the network to the host system, wherein the host system is connected to the network through the switch and the NIC, and wherein the host system accesses the network storage of the one or more data storage systems through the network using the switch and the NIC connected to the network.

13. The host system of claim 9, wherein the ACC is a non-transparent bridge (NTB).

14. The host system of claim 13, wherein the multi-layer driver includes a standard kernel driver, an intermediate layer and an interface layer that communicates with the NTB and the one or more local physical storage devices of the host system.

15. The host system of claim 14, wherein at runtime, the I/O command invokes a first routine in the standard kernel driver, the first routine invokes a second routine of the intermediate layer, and the second routine invokes a third routine of the interface layer.

16. A host system comprising:
a host processor;
a NIC connected directly to the host processor;
one or more local physical storage devices of the host system directly connected to one or more ports of the host processor;
wherein an ACC is configured on the one or more ports of the host processor directly connected to the one or more local physical storage devices of the host system;
wherein a partition is configured that includes the host processor as an RC, the NIC as an endpoint, and the one or more ports of the host processor, which are configured as the ACC and which are directly connected to the one or more local physical storage devices, as an endpoint; and
wherein the NIC is configured with a processor that executes an application which issues commands to the ACC using a multi-layer driver, wherein the commands include an I/O command directed to a target address mapped to a physical storage location on a first of the one or more local physical storage devices.

17. The host system of claim 16, wherein the I/O command is serviced by the first local physical storage device, wherein the I/O command reads data from or writes data to the target address, wherein the target address is a logical address on a block device configured on the first local physical storage device of the host system, and wherein the I/O command is sent over a first connection between the NIC to the host CPU, over a second connection between the host CPU and the first local physical storage device, wherein the second connection is between a first of the ports of the host processor configured as a port of the ACC and another port of the first physical storage device.

18. The host system of claim 16, wherein the host processor, as the RC of the partition, performs discovery processing that enumerates the NIC as an endpoint, and that enumerates the one or more ports of the host processor, which are configured as the ACC and which are directly connected to the one or more local physical storage devices, as an endpoint.

19. The host system of claim 16, wherein the ACC is an NTB, and wherein the multi-layer driver includes a standard kernel driver, an intermediate layer and an interface layer that communicates with the NTB and the one or more local physical storage devices of the host system.

20. The host system of claim 19, wherein at runtime, the I/O command invokes a first routine in the standard kernel driver, the first routine invokes a second routine of the intermediate layer, and the second routine invokes a third routine of the interface layer.

* * * * *